(12) United States Patent
Bayer et al.

(10) Patent No.: US 12,518,919 B2
(45) Date of Patent: Jan. 6, 2026

(54) CERAMIC MATERIAL FOR CAPACITOR

(71) Applicant: TDK Electronics AG, Munich (DE)

(72) Inventors: Thorsten Bayer, Deutschlandsberg (AT); Michael Schossmann, Frauental A.D. Lasnitz (AT)

(73) Assignee: TDK ELECTRONICS AG, Munich (DE)

( * ) Notice: Subject to any disclaimer, the term of this patent is extended or adjusted under 35 U.S.C. 154(b) by 333 days.

(21) Appl. No.: 18/005,376

(22) PCT Filed: Jun. 22, 2021

(86) PCT No.: PCT/EP2021/067000
§ 371 (c)(1),
(2) Date: Jan. 13, 2023

(87) PCT Pub. No.: WO2022/012880
PCT Pub. Date: Jan. 20, 2022

(65) Prior Publication Data
US 2023/0268126 A1 Aug. 24, 2023

(30) Foreign Application Priority Data
Jul. 16, 2020 (DE) .......................... 102020118859.5

(51) Int. Cl.
*H01G 4/12* (2006.01)
*C04B 35/495* (2006.01)
(Continued)

(52) U.S. Cl.
CPC ......... *H01G 4/1218* (2013.01); *C04B 35/495* (2013.01); *C04B 41/0072* (2013.01);
(Continued)

(58) Field of Classification Search
CPC ........ H01G 4/1218; H01G 4/01; H01G 4/252; H01G 4/30; H01G 4/38; C04B 35/495;
(Continued)

(56) References Cited

U.S. PATENT DOCUMENTS

| 5,164,882 A | 11/1992 | Kanai et al. |
| 5,433,917 A | 7/1995 | Srivastava et al. |

(Continued)

FOREIGN PATENT DOCUMENTS

| AT | 515462 B1 | 7/2018 |
| CN | 107010949 A | 8/2017 |

(Continued)

OTHER PUBLICATIONS

Chinese Office Action issued in corresponding Chinese Patent Application No. 202180049863.6 dated Dec. 6, 2023, with English language translation, 20 pages.

(Continued)

*Primary Examiner* — Timothy J. Dole
*Assistant Examiner* — Daniel M Dubuisson
(74) *Attorney, Agent, or Firm* — MH2 Technology Law Group LLP

(57) ABSTRACT

The present invention relates to a ceramic material for a multilayer capacitor. The ceramic material has a composition according to the following general formula:

$Pb_{(y-1.5a-0.5b+c+0.5d-0.5e-f)}Ca_aA_b(Zr_{1-x}Ti_x)_{(1-c-d-e-d)}$
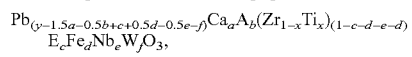
$E_cFe_dNb_eW_fO_3$, where
A is one or more of the group of Na, K and Ag;
E is one or more of the group of Cu, Ni, Hf, Si and Mn; and
$0 < a < 0.14$,
$0.05 \le x \le 0.3$,
$0 \le b \le 0.12$, (Continued)

$0 < c \leq 0.12$,
$0 \leq d \leq 0.12$,
$0 \leq e \leq 0.12$,
$0 \leq f \leq 0.12$,
$0.9 \leq y \leq 1.5$ and
$0.001 < b+c+d+e+f$
applies.
Further, the invention includes a capacitor comprising the described ceramic material.

32 Claims, 4 Drawing Sheets

(51) Int. Cl.
| | |
|---|---|
| C04B 41/00 | (2006.01) |
| H01G 4/01 | (2006.01) |
| H01G 4/252 | (2006.01) |
| H01G 4/30 | (2006.01) |
| H01G 4/38 | (2006.01) |

(52) U.S. Cl.
CPC .............. *H01G 4/01* (2013.01); *H01G 4/252* (2013.01); *H01G 4/30* (2013.01); *H01G 4/38* (2013.01); *C04B 2235/326* (2013.01); *C04B 2235/96* (2013.01)

(58) Field of Classification Search
CPC .......... C04B 41/0072; C04B 2235/326; C04B 2235/96
See application file for complete search history.

(56) References Cited

U.S. PATENT DOCUMENTS

| | | | |
|---|---|---|---|
| 5,625,529 A | 4/1997 | Lee et al. | |
| 6,515,844 B1 * | 2/2003 | Moriwaki | H01G 2/065 361/306.3 |
| 2003/0168624 A1 | 9/2003 | Hammer et al. | |
| 2005/0135074 A1 * | 6/2005 | Dunn | H05K 1/162 361/321.1 |
| 2007/0014075 A1 * | 1/2007 | Ritter | H01G 4/30 361/306.3 |
| 2015/0131200 A1 | 5/2015 | Engel et al. | |
| 2015/0194264 A1 * | 7/2015 | Engel | H01G 4/1209 361/301.4 |
| 2015/0294792 A1 * | 10/2015 | Schossmann | B32B 15/04 156/290 |
| 2015/0371778 A1 | 12/2015 | Engel et al. | |
| 2016/0240318 A1 | 8/2016 | Engel et al. | |
| 2016/0340258 A1 * | 11/2016 | Engel | H01G 4/30 |
| 2018/0012706 A1 * | 1/2018 | Bultitude | H01G 4/33 |
| 2019/0267193 A1 * | 8/2019 | Beck | H01G 4/1245 |

FOREIGN PATENT DOCUMENTS

| | | | |
|---|---|---|---|
| DE | 4141648 C2 | 1/1997 | |
| DE | 102006057691 A1 * | 6/2008 | ........... C04B 35/491 |
| DE | 102007029601 A1 | 1/2009 | |
| DE | 102012111023 A1 | 5/2014 | |
| DE | 102013102278 A1 | 9/2014 | |
| DE | 102013108753 A1 | 2/2015 | |
| DE | 102015102866 A1 | 9/2016 | |
| DE | 102018104459 A1 | 8/2019 | |
| EP | 2942338 A1 | 11/2015 | |
| EP | 3107880 B1 | 1/2020 | |
| JP | S59-201479 A | 11/1984 | |
| JP | S61-185983 A | 8/1986 | |
| JP | H10-203868 A | 8/1998 | |
| JP | 2014157822 A | 8/2014 | |
| JP | 2015535145 A | 12/2015 | |
| WO | 2013152887 A1 | 10/2013 | |
| WO | 2016134804 A1 | 9/2016 | |
| WO | WO-2017212070 A1 * | 12/2017 | ............. H01G 4/005 |

OTHER PUBLICATIONS

Fundamentals of Electronic Ceramics Technology Teaching and Research Group of New Inorganic Materials at Shanghai University of Science and Technology, p. 122, Shanghai People's Publishing House, Dec. 31, 1977.
Beitollahi et al.: "Effect of the Addition Of $Ca^{2+}$ on the Structure, Microstructure and Ferroelectric Properties Of $(Pb_{1-y}Ca_y)(Zr_{0.8}Ti_{0.2})O_3$ System With Y=0.0, 0.02, 0.05 and 0.1", Journal of Material Science, Kluwer Academic Publishers, Dordrecht, vol. 38, Nr. 6, 15. März 2003 (Mar. 15, 2003), pp. 1219-1229, XP001232010.
Huang et al.: "Microstructural and dielectric studies of A-site calcium doped $PbZr_{0.94}Ti_{0.06}O_3$ ceramics.", J Electroceram 16, 343-346 (2006); https://doi.org/10.1007/s10832-006-9876-2.
Kanai et al.: "Dielectric Properties of $(Pb_{1-x}X_x)(Zr_{0.7}Ti_{0.3})O_3$ (X = Ca, Sr, Ba) Ceramics", Toshiba Research and Development Center, Toshiba Corporation, 1 Toshiba-cho, Komukai, Saiwai-ku, Kawasaki 210, Japan; J. Am. Ceram. Soc., 77 (10) 2620-24 (1994).
Gachigi "Electrical energy storage in antiferroelectric-ferroelectric phase switching, chemically modified lead zirconate ceramics", Ph.D. Thesis, The Pennsylvania State University, PA, May 1997, 202 pages.
International Search Report dated Sep. 16, 2021, PCT Application No. PCT/EP2021/067000, 7 pages including English translation.
Japanese Office Action issued in corresponding Japanese Patent Application No. 2023-502591 dated Aug. 28, 2024, with English language translation, 10 pages.
Wu, Jiagang, "Enhanced ferroelectric property of $(Pb_{0.95}Ca_{0.05})(Nb_{0.02}Zr_{0.80}Ti_{0.20})O_3$ thin films prepared by RF magnetron sputtering" Applied Surface Science, 2007, vol. 253 No. 14, p. 6222-6225, 10.1016/j. apsusc. 2007.01.094.
Chen Hong, "Piezoelectric Ceramics and Applications Thereof" Shaanxi Normal University Press, May 31, 2019, pp. 73-74.
Yang Kunchao, "Practical Manual for Electronic Material Research and Development, Production and Processing Technology, and Quality Testing Standards" Jinban Electronic Publishing Company, Jun. 30, 2003, p. 1170.
Chinese Office Action issued in Chinese Patent Application No. 20 dated Aug. 7, 2023, with English language translation, 30 pages.
Japanese Office Action issued in corresponding Japanese Patent Application No. 2023-502591 dated Mar. 6, 2024, with English language translation, 7 pages.

* cited by examiner

CERAMIC MATERIAL FOR CAPACITOR

CROSS-REFERENCE TO RELATED APPLICATIONS

The present application is the national stage entry of International Patent Application No. PCT/EP2021/067000, filed on Jun. 22, 2021, and published as WO 2022/012880 A1 on Jan. 20, 2022, which claims the benefit of priority of German Patent Application No. 10 2020 118 859.5, filed on Jul. 16, 2020, the disclosures of all of which are incorporated by reference herein in their entireties.

FIELD OF THE INVENTION

The present invention relates to a ceramic material for a capacitor using multilayer technology.

BACKGROUND OF THE INVENTION

Ceramic capacitors comprise at least two electrical conductors between which a dielectric ceramic layer is arranged. The properties of ceramic capacitors are essentially determined by the polarization properties of the ceramic dielectric.

Certain materials exhibit spontaneous polarization in the absence of an electric field. If the direction of spontaneous polarization can be changed by applying an electric field, the materials are called ferroelectric. If, during the phase transition from the paraelectric phase, the ions of a ferroelectric shift antiparallel to each other rather than parallel to each other, the material is called anti-ferroelectric.

A ceramic material mainly used for piezoelectric elements so far is the lead zirconate titanate system ($Pb(Zr_xTi_{1-x})O_3$ or PZT). This represents a solid solution (gapless solid solution series) of anti-ferroelectric lead zirconate ($PbZrO_3$) and ferroelectric lead titanate ($PbTiO_3$, PTO), which can exhibit both ferroelectric and anti-ferroelectric properties depending on its composition.

The phase diagram (FIG. 1) shows how the Curie temperature and crystal symmetry of the PZT system depend on its composition. FT and FR are ferroelectric tetragonal and rhombohedral phases, respectively. PC denotes the paraelectric cubic phase. AO and AT stand for anti-ferroelectric orthorhombic and tetragonal phases, respectively. HT stands for the high temperature phase, LT stands for the low temperature phase.

Figure 1:
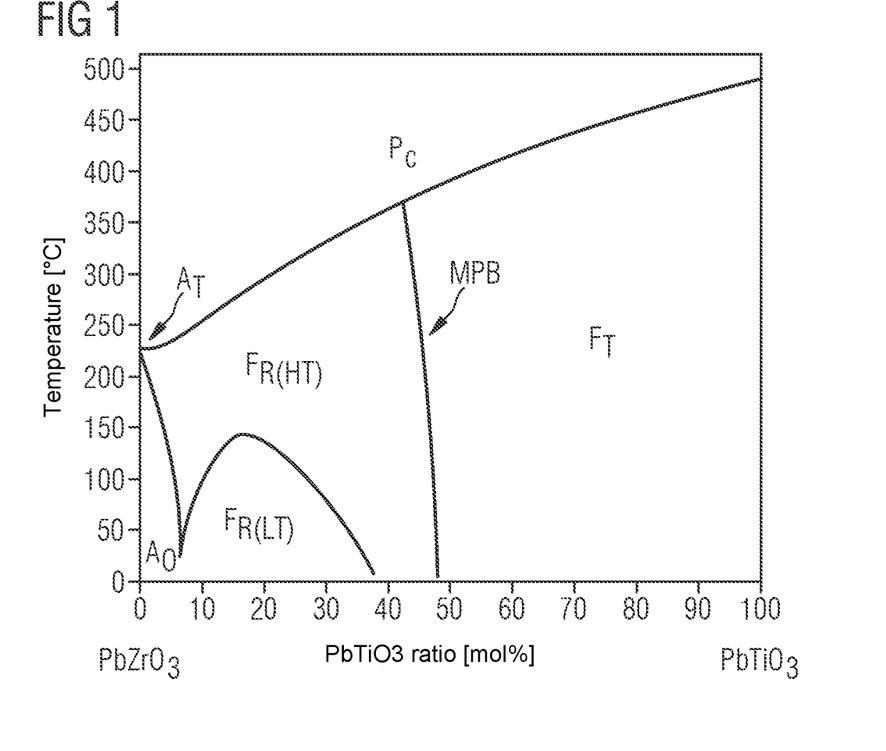
FIG. 1: Phase diagram of $PbZrO_3$—$PbTiO_3$ solid solution series with variation of temperature.

Starting from pure PTO, continuous substitution of titanium ions by zirconium ions lowers the Curie point from the original 490° C. ($T_c$(PTO)) to 230° C. ($T_c$(PZO)) for pure PZO; in the process, the symmetry at room temperature changes from FT to FR to AO. Above $T_c$, PZT is paraelectric.

When the temperature falls below the Curie temperature, a deformation of the cubic structure takes place. This deformation depends on the Zr/Ti ratio. That is, the Ti rich PZT solid solutions are ferroelectric and tetragonal at room temperature. In contrast, the Zr-rich PZT solid solutions are anti-ferroelectric and orthorhombic (O-phase) or ferroelectric and rhombohedral.

PZT materials have so far mainly been used for piezo elements, e.g. piezo actuators. The piezoelectric properties required for this are particularly pronounced at the so-called morphotropic phase boundary (MPB), which separates the two FE phases (FT and FR). Two different crystal structures are formed only after slight variation of the Zr/Ti ratio. The MPB lies between $PbZr_{0.6}Ti_{0.4}O_3$ and $PbZr_{0.55}Ti_{0.45}O_3$.

SUMMARY OF THE INVENTION

One task of embodiments of the invention is to provide a ceramic material with improved properties suitable for capacitors in multilayer technology.

The task is solved by a ceramic material for capacitors in multilayer technology of the general formula:

$$Pb_{(y-1.5a-0.5b+c+0.5d-0.5e-f)}Ca_aA_b(Zr_{1-x}Ti_x)_{(1-c-d-e-d)}E_cFe_dNb_eW_fO_3,$$

where
A is one or more of the group of Na, K and Ag;
E is one or more of Cu, Ni, Hf, Si and Mn; and
$0 < a < 0.14$,
$0.05 \le x \le 0.3$,
$0 \le b \le 0.12$,
$0 < c \le 0.12$,
$0 \le d \le 0.12$,
$0 \le e \le 0.12$,
$0 \le f \le 0.12$,
$0.9 \le y \le 1.5$ and
$0.001 < b+c+d+e+f$
applies.

The claimed ceramic material is a lead calcium zirconate titanate (PCZT), which has improved properties compared to a PZT.

According to the invention, a particularly Zr-rich PZT solid solution phase is selected from the phase diagram. Doping with Ca allows comparatively high levels of titanium in the ceramic while maintaining a desired anti-ferroelectric crystal structure.

The shift of the phase boundaries upon doping with Ca is similar to the shift upon doping with La, which has already been studied in detail in the literature.

Figure 2:
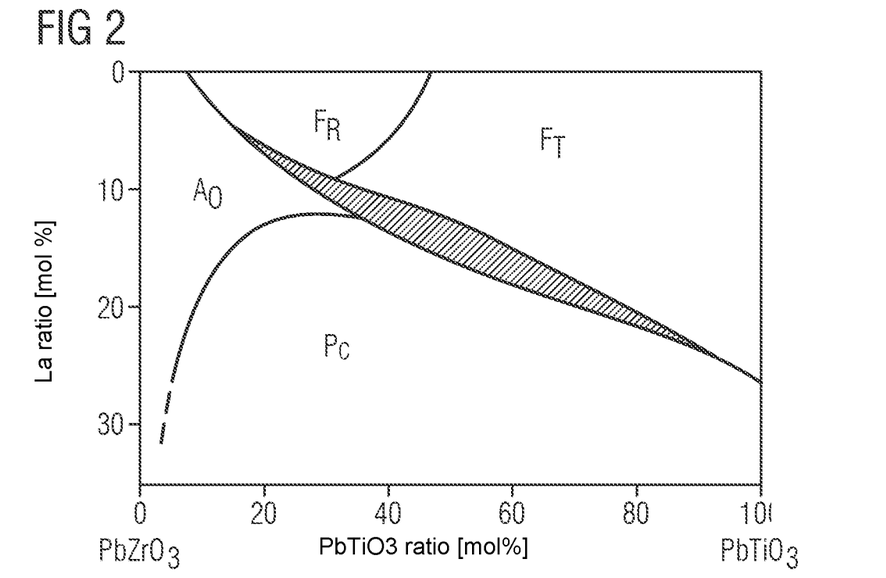
FIG. 2: Phase diagram of the $PbZrO_3$—$PbTiO_3$ solid solution series when doped with lanthanum at room temperature.

The dependence of the phase boundary on the La content at room temperature is shown in a second phase diagram (FIG. 2). Thus, the boundary between the anti-ferroelectric-orthorombic phase and the ferroelectric-rhombohedral phase at room temperature in a pure PZT crystal is less than 10% titanate.

If at least part of the lead is replaced by lanthanum, the described phase boundary initially shifts in the direction of larger titanate fractions. The maximum is reached at about 10 to 15 mol % lanthanum doping. Here, an anti-ferroelectric phase with up to 35 mol % titanate is possible.

With further increasing La content, the phase boundary to the paraelectric, cubic phase shifts again towards lower titanate contents. The maximum titanate content in the anti-ferroelectric phase is reached near the triple point between the AO, PC and FT phases.

In addition, the condition $b+c+d+e+f > 0$ specifies that at least one further dopant is contained in the ceramic material according to the invention.

At least one further dopant element is selected from the group A defined in the main claim, comprising the alkali metals Na and K and Ag; and from a group E comprising Cu, Ni, Hf, Si and Mn. Further possible dopants are one or more of Fe, Nb and W. Hereby, the sintering temperature of the ceramic material can be lowered, which allows a combination with other materials/materials not resistant at higher temperatures already during the manufacturing process of the ceramic material.

For example, sintering of the ceramic material ("co-firing" process) with inner electrodes made of metals such as silver or copper becomes possible.

In addition, low sintering temperatures favor the formation of small grain sizes of the ceramic material, which has a favorable effect on the dielectric properties. More precisely, the dielectric properties of PZT ceramics are generally also determined by the domain size. Domains are regions in the ceramic with the same polarization. The domain size is related to the grain size. The number of domains per grain increases with increasing grain size. The change in domain size has consequences for the material properties of the ceramic. It is therefore desirable to control the grain size or grain growth.

Typically, the lead zirconate titanate ceramic doped according to the invention has a perovskite lattice, which can be described by the general formula $ABO_3$, where A represents the A sites and B represents the B sites of the perovskite lattice.

The perovskite lattice is characterized by high tolerance to doping and vacancies.

An elementary cell of the PZT crystal lattice can be described by a cube. The A sites are occupied by $Pb^{2+}$ ions or $Ca^{2+}$ ions, which sit on the corners of the cube. In the center of each face of the cube sits an $O^{2-}$ ion. In the center of the cube is a $Ti^{4+}$-ion or a $Zr^{4+}$-ion (B sites). This structure has a high tolerance to substitution of metal ions by other metal ions and vacancies, which makes it well suited for doping.

Depending on the size difference between the ion introduced by doping and the ion replaced, distortion of the highly symmetric coordination polyhedron may occur. This distortion can change the center of symmetry of the crystal and thus affect the polarizability.

The different possibilities of doping can be classified on the basis of the valence of the doping ion. Isovalent doping, i.e. the replacement of an ion by another ion with the same valence, does not affect possible vacancies in the ceramic material.

If lower valent cations (acceptors) replace cations with a higher valence, vacancies are created in the anion lattice.

Higher valent cations (donors), when they replace lower valent cations, cause vacancies in the cation lattice. Doping with acceptors and donors each leads to characteristic changes in the material properties. Acceptor-doped ceramics are also referred to as "hard" ceramics, donor-doped ceramics as "soft" ceramics.

For example, doping with $Nd^{3+}$ or a comparable rare earth element on the A sites according to the non-invention represents donor doping. Due to the ionic radius of neodymium, this is incorporated on the $Pb^{2+}$ sites. Charge balance is achieved by the corresponding formation of Pb vacancies. The effect of doping is metric changes of the lattice and the influence of longer acting interactions between the elementary cells.

Dopants for the A sites in the PZT lattice according to the invention comprise, in addition to calcium ions, the substances of group A from the main claim.

Calcium, which is contained in the ceramic according to the main claim, is incorporated on the $Pb^{2+}$ sites due to its ionic radius. Thus, calcium ions are more suitable for doping a PZT ceramic than, for example, lanthanum ions. Due to the equivalent charge of $Pb^{2+}$ and $Ca^{2+}$ ions, no charge balancing by A-site or O-site vacancies is necessary.

Doping with $Ag^{2+}$ ions also represents isovalent doping.

Doping with $K^+$ or $Na^+$ on the A sites represents acceptor doping. Due to the ionic radius of potassium or sodium, these are also incorporated on the $Pb^{2+}$ sites. Charge balance is achieved by reduction of $Pb^{2+}$ vacancies (A vacancies) and/or the corresponding formation of oxygen vacancies. The effect of doping is oxygen vacancy formation promoting grain growth and sinter densification, which is induced at the sintering temperature by K or Na acceptors.

Additional doping, for example with ions of Cu, Ni, Hf, Si, Mn, Fe, Nb and W, serves to control additional vacancies or metric changes of the lattice and to influence longer acting interactions between the unit cells.

Based on their ionic radius, the ions mentioned in the last paragraph are incorporated on the B sites of the PZT lattice.

Doping with $Fe^{3+}$ on the B sites, for example, represents acceptor doping. Charge balance is achieved by reducing $Pb^{2+}$ vacancies (A vacancies) and/or the corresponding formation of oxygen vacancies. The effects of doping are again to promote sinter densification and to control electrical properties.

Other acceptor dopants are $Cu^{2+}$ or $Ni^{2+}$. Typical donor dopants are $Nb^{5+}$ or $W^{6+}$ ions.

With a suitable combination of acceptor and donor dopants, quasi-neutral defect pairs can be formed so that there is no or only a very low lead or oxygen vacancy concentration in the finished ceramic.

Depending on the raw materials used, the ceramic may also contain ions of other elements.

Typically, when zirconium is used, for example, doping with hafnium also occurs. This doping already results from the natural occurrence of Hf in the raw zirconium material.

In addition, doping with silicon or manganese, for example, also has advantages.

With respect to the Ca content a in the claimed ceramic material, in one embodiment $0.001 \leq a < 0.14$ is fulfilled. In another embodiment, the Ca content is $0.01 \leq a < 0.14$.

Thus, based on the explained advantages and properties of doping, in one embodiment of the invention $0.001 < b < 0.12$ is fulfilled.

Based on the explained advantages and properties of doping, in another embodiment of the invention $0.001 < c < 0.12$ is fulfilled.

In another embodiment of the invention $0.001 < d < 0.12$ is fulfilled.

In another embodiment of the invention $0.001 < e < 0.12$ is fulfilled.

In another embodiment of the invention $0.001 < f < 0.12$ is fulfilled.

In another embodiment of the invention $0.005 < b+c+d+e+f$ is fulfilled.

When doped with the above elements, the durability and resistance of the ceramic material can be further improved and its service life increased.

In a further embodiment, the ceramic material is an anti-ferroelectric dielectric. For this purpose, the base material PCZT is preferably selected from the anti-ferroelectric orthorhombic phase region (O phase).

The anti-ferroelectric order is characterized by a superposition of several polar sublattices whose electric dipole moments balance each other. Thus, an anti-ferroelectric crystal does not exhibit remanent polarization, but it does exhibit special dielectric properties.

If an electric field is applied to the anti-ferroelectric, it initially behaves like a linear dielectric. Above a certain critical field strength, a sudden transition into the ferroelectric phase is induced and the formerly antiparallel dipoles flip over into the then energetically more favorable, parallel orientation.

Figure 3:
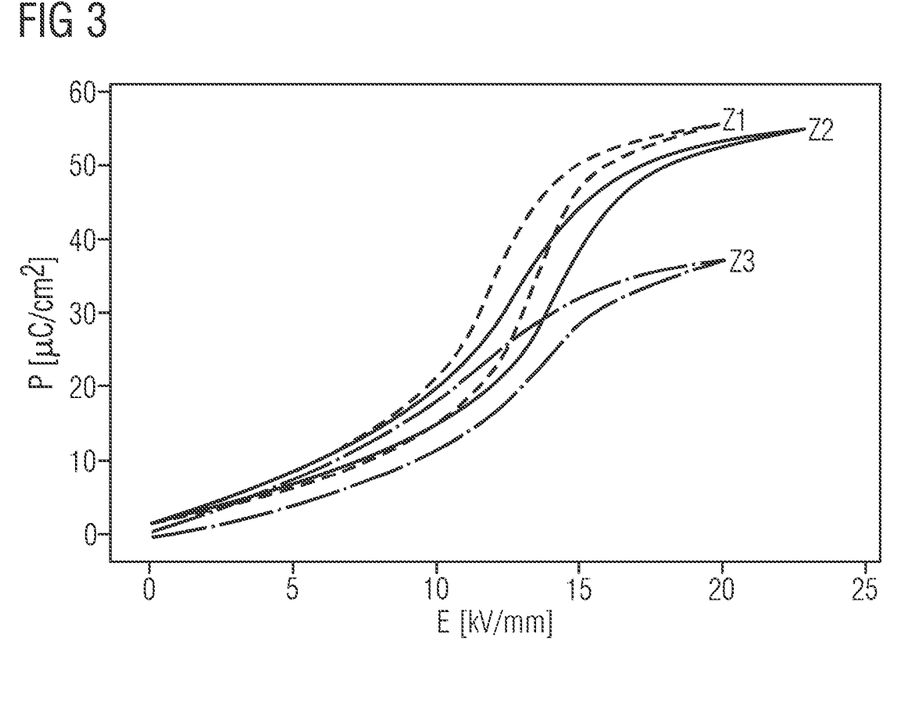
FIG. 3: Comparison of hysteresis curves at positive values of the electric field of anti-ferroelectric ceramics of compositions
1. $Pb_{0.9}Ca_{0.1}Zr_{0.891}Ti_{0.099}Cu_{0.005}W_{0.005}O_3$.
2. $Pb_{0.9}Ca_{0.1}Zr_{0.8865}Ti_{0.0985}Cu_{0.005}Nb_{0.01}O_3$ and
3. $Pb_{0.9}Ca_{0.1}Zr_{0.8865}Ti_{0.985}Ni_{0.005}Nb_{0.01}O_3$.
The sample thickness is 180 μm in each case. The diameter of the measured area is 5 mm in each case.
Figure 4:
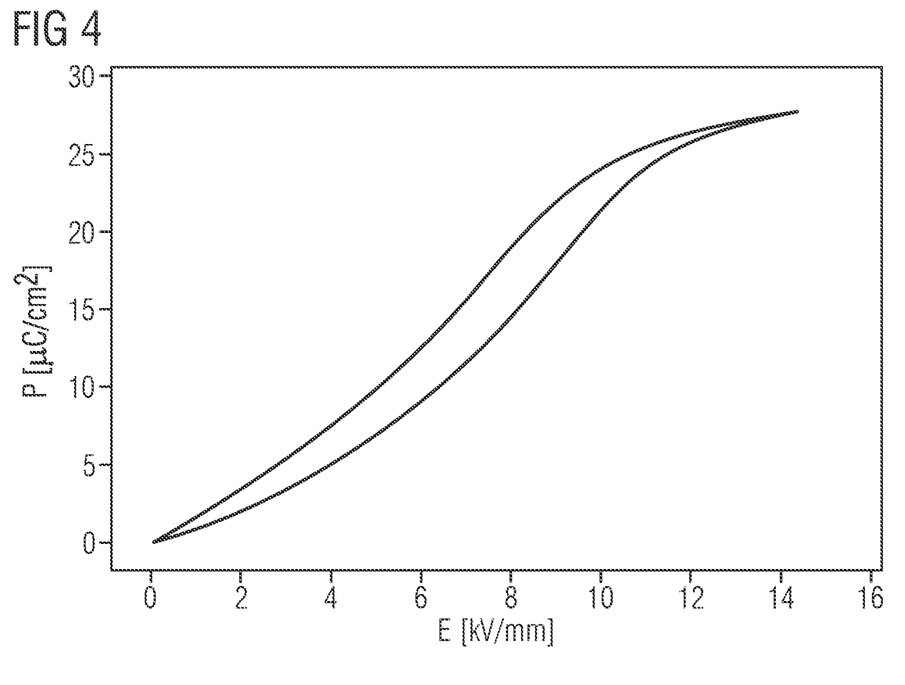
FIG. 4: Hysteresis curves at positive electric field values of a multilayer ceramic capacitor comprising a ceramic of composition $Pb_{0.9}Ca_{0.1}Zr_{0.891}Ti_{0.099}Cu_{0.005}W_{0.005}O_3$ and copper electrodes.

The reverse transition, on the other hand, takes place at a lower field strength. This results in a so-called double hysteresis loop. FIGS. 3 and 4 each show the hysteresis loop at positive values of the electric field.

Anti-ferroelectric ceramic materials have a less pronounced polarization field strength hysteresis compared to ferroelectric ceramic materials. This leads to lower energy losses when used in capacitors. For this reason, the use of anti-ferroelectric ceramic materials is preferred according to the invention.

In one embodiment, the sintering temperature of the ceramic material is between 900° C. and 1200° C.

Such a low sintering temperature can be achieved by the composition of the ceramic according to the invention and a suitable doping.

A low sintering temperature allows a combination with other materials/materials not resistant at higher temperatures already during the manufacturing process of the ceramic material.

For example, sintering of the ceramic material ("co-firing" process) with inner electrodes made of metals such as silver or copper becomes possible.

In a preferred embodiment, the sintering temperature of the ceramic material is between 980° C. and 1080° C.

In another embodiment, the sintering temperature of the ceramic material is below the melting point of copper. The melting point of copper is 1085° C.

In a further embodiment, the sintering temperature of the ceramic material is below the melting point of silver. The melting point of silver is 962° C.

A mixed oxide process or solvent-based processes, also called sol-gel processes, can be used to prepare pure and variously doped lead calcium zirconate titanate (PCZT) powders.

The starting point is, for example, solutions of the acetates or alcoholates of the constituent metals, which are converted into granulated xerogels, the ceramic precursors, via various drying processes. Spray drying and spray freeze granulation followed by freeze drying are available for drying, for example. The precursors are then pyrolyzed to the oxides. Powders produced in this way can be deagglomerated with little effort and conditioned for further processing.

Furthermore, the invention relates to a capacitor comprising dielectric layers of the ceramic material according to the invention and electrode layers arranged in between. The individual layers are arranged one above the other in a defined layer order. The electrode layers have at least first and/or second electrodes.

Preferably, the capacitor has a plurality of first electrodes and a plurality of second electrodes. Such a capacitor is called a multilayer capacitor.

In one embodiment of the capacitor, the first and second electrodes at least partially overlap.

In their overlapping region, the first and second electrodes thus form an active region.

In one embodiment, the first and second electrodes are pronounced in the same electrode layers but are spaced apart by a dielectric section.

In another embodiment, an electrode layer comprises only one first electrode or only one second electrode at a time. Electrode layers with electrodes of both types are stacked alternately in the capacitor.

In one embodiment, the electrodes comprise one or more from the group of copper, silver, nickel, platinum and palladium.

These metals are particularly suitable due to their high electrical conductivity.

For simple and cost-effective production, it is preferable that the entire capacitor is sintered in one step, as described above. The sintering step thus takes place after the stacking of the individual layers.

To enable such a process, the sintering temperature of the ceramics used for the dielectric layers must not exceed the melting temperature of the metals used for the electrodes.

This is fulfilled by using the dielectric ceramic according to the invention, which may be formed according to any of the embodiments described above.

In one embodiment, the capacitor comprises two segments. Each segment comprises dielectric layers of the ceramic material and electrode layers disposed there between. The outermost dielectric layers of two segments further form an connection region in which the segments are fixedly connected to each other parallel to the layer planes.

The connection region further includes a relief region where the connection of the segments is weakened or broken.

The relief region keeps mechanical stresses in the capacitor low. Thus, the relief region serves to relieve the capacitor in case of mechanical deformations due to the applied electric field.

The relief region prevents the addition of mechanical stresses over the entire capacitor. The thickness of the segments is preferably so small that mechanical stresses in the segments do not lead to the formation of cracks in the capacitor.

Preferably, this weakening is pronounced in the stacking direction, which corresponds to the field direction of the capacitor. The weakening can be achieved by forming a gap or using materials of different elastic moduli, preferably materials of lower elastic modulus values. Alternatively, weakening can be achieved by inserting a material that is harder or more brittle than the ceramic. In the event of loading, this material may fracture.

In one embodiment, the capacitor includes two separate external contacts for contacting the first and second electrodes. The external contacts are applied to exit surfaces on the outside of the capacitor where electrodes exit the capacitor. The exit surfaces of the first and second electrodes are two oppositely positioned outer surfaces of the capacitor.

The external contacts are used for contacting electrodes of the same type to each other and for contacting the electrodes to the outside. For example, all first electrodes are electronically connected to each other via the first external contact. All second electrodes are electronically connected to each other via the second external contact.

Possible third or further electrodes, on the other hand, are not contacted by the external contacts.

In one embodiment, the capacitor includes at least one third electrode that is not contacted by any of the external contacts. In one embodiment, the third electrode is not adjacent to any of the outer contacts of the capacitor. The third electrode overlaps the first and second electrodes.

Such an electrode is also called a "floating" electrode.

Preferably, the capacitor has a plurality of first electrodes, a plurality of second electrodes, and a plurality of third electrodes.

In one embodiment, the capacitor comprises at least one series connection of two capacitances. In particular, a first capacitance may be formed by the overlap of at least one first electrode with at least one third electrode and a second capacitance may be formed by the overlap of at least one second electrode with the at least one third electrode.

In one embodiment, the capacitor includes additional electrodes that do not overlap with any electrodes of a different polarity.

Thus, no electric field is established between these electrodes. Such electrodes are called passive or blind electrodes.

Such blind electrodes reduce mechanical stresses that typically occur between regions with electrodes and regions without electrodes within the capacitor.

The combined use of blind electrodes and relief regions can thus minimize mechanical stresses in the multilayer capacitor and increase the robustness of the capacitor. The thermomechanical and electrical load capacity of the multilayer capacitor can thus be optimized.

In another embodiment, the external contacts comprise a multilayer sputter layer comprising layers consisting of chromium, nickel, and at least one of silver or gold, the layers being deposited on the exit surfaces in that order.

The chromium layer, which is applied directly to the exit surface, enables high adhesion of the sputter layer to the exit surface. The layer of silver or gold exhibits high conductivity and thus serves primarily to provide electrical contact between the electrodes. The sputter layer described allows all electrodes of one type to be electrically connected to each other and thus connected in parallel.

The middle layer of nickel serves as a diffusion barrier.

For example, all of the first electrodes that all exit the capacitor at the same first surface can be electrically connected to each other via a first sputter layer. Furthermore, all second electrodes, which all exit at a second surface, can be electrically connected via a further second sputter layer or connected in parallel, so that, for example, the entire stack comprising all first and all second electrodes forms a single multilayer capacitor.

In one embodiment, the outer contacts further comprise a fine mesh copper grid deposited on the sputter layer.

The copper grid covers the entire sputter layer. Thus, the copper grid can prevent the formation of cracks in the sputter layer or even the crumbling of the sputter layer in case of mechanical deformation of the capacitor.

In one embodiment, the external contacts further comprise metal sheets via which the capacitor element is contacted to the outside. The metal sheets are attached to the sputter layer.

In one embodiment, the metal sheets are attached to the sputter layer by a solder joint.

In another embodiment, the metal sheets are deposited on the sputter layer by means of a sintered silver layer.

While the described sputter layer usually has a thickness in the nanometer range, the silver layer has a thickness in the micrometer range. Such a sintered silver layer covering the entire sputter layer holds the sputter layer together in case of deformations of the capacitor and prevents, for example, the sputter layer from crumbling.

The silver layer continues to attach the metal sheets to the sputter layer. Thus, no further solder joints are necessary. For this purpose, the silver is applied to the sputter layer and the metal sheets are placed directly on top. Only after the metal sheets have been placed is the silver layer sintered at the lowest possible pressure.

In at least one embodiment, the silver layer is sintered at such a low pressure that a residual porosity of about 35% is achieved.

Such porosity is low enough to reduce the electrical and thermal conductivity of the silver only slightly. Due to its high electrical and thermal conductivity, the silver layer still enables good electrical bonding of the metal sheets to the sputter layer. In addition, however, silver with the aforementioned porosity exhibits sufficiently high ductility to ensure thermomechanical relief.

Furthermore, a sintered silver layer exhibits lower material fatigue under mechanical or thermomechanical stress compared to, for example, soldered layers.

Since the process temperatures for sintering are generally lower than for brazing, lower thermomechanical stresses continue to occur and the process can be carried out relatively simply and inexpensively.

The high melting point of the sintered silver of maximum 962° C. in the case of pure silver guarantees high temperature stability of the silver layer, which enables further process steps at high temperatures.

In one embodiment, the metal sheets comprise two copper layers and an invar layer disposed therebetween.

Copper has particularly good electrical and thermal conductivity.

Invar is the name given to an iron-nickel alloy with approx. ⅓ nickel and ⅔ iron. This material has a particularly low coefficient of thermal expansion. In particular, the coefficient of thermal expansion is close to the coefficient of expansion of ceramics. Due to the combination with copper, sufficient conductivity of the terminal contact can be ensured despite a low electrical conductivity of the Invar.

As an alternative to Invar, other iron-nickel or iron-nickel-cobalt alloys can also be used.

To produce the metal sheet described, for example, copper layers are rolled onto an invar sheet.

The outer surfaces of the copper layers may be silver plated to improve bonding between the copper and the sintered silver layer. In one embodiment, the silver plating is applied by electroplating.

In one embodiment, the metal sheets of the outer contacts comprise a copper layer with a meandering geometry.

The copper layer is applied directly to the silver layer. The copper layer preferably has a meandering, lattice-like geometry. The copper layer may also be silver-plated. The silver plating is preferably carried out by electroplating. The copper layer can be sintered directly to the silver layer.

Copper is the preferred material for external contacting of the capacitor due to its excellent thermal and electrical conductivity.

In one embodiment, the capacitor comprises separable capacitor elements that can be assembled and disassembled as desired at a contact area, the contact area being arranged normal to the layer planes and the external contacts.

Thus, a capacitor of any size can be flexibly assembled. The capacitor units described can be mass-produced in a unit size and then assembled according to requirements.

The individual capacitor units can be fixed in place, for example, by means of a sintered silver layer which extends over the outer surfaces of all the capacitor units, thus holding them together.

To manufacture the ceramic capacitor according to the invention, for example, a thin ceramic film is drawn from a suspension of the unsintered ceramic powder according to the invention with a suitable binder. This is screen-printed with a metal paste, the future electrodes. The metal paste can contain, for example, Cu or Ag or another metal with good conductivity.

The printed films are stacked on top of each other in the number of layers required for the capacitor and consolidated by pressing. In addition to the relative permittivity (dielectric constant) of the ceramic, the number of layers on top of each other and the layer thickness determine the subsequent capacitance value of the capacitor.

The printing and layering can be done by stacking the electrodes in the stack alternately, slightly offset from each other, so that they can later be contacted with the connection surfaces on one side in a comb-like manner.

The layered and pressed stack can then be divided into the individual capacitors in the case of a mass production process.

After cutting, the binder is first baked out of the separated condensers (debinding). This is followed by the firing process. In this process, the ceramic powder is sintered at temperatures between 900° C. and 1200° C., preferably at 980° C. to 1080 C, and acquires its final, predominantly crystalline structure.

Only this firing process gives the ceramic its desired dielectric behavior. The firing process is followed by a cleaning step and, in at least one embodiment, the subsequent application of the outer contact.

BRIEF DESCRIPTION OF THE DRAWINGS

The invention is described in detail below with reference to figures.

It show.

DETAILED DESCRIPTION

FIGS. 1 and 2 show the phase diagrams of the $PbZrO_3$—$PbTiO_3$ solid solution series at different temperatures (FIG. 1) and at room temperature and doping with La (FIG. 2), respectively, which were introduced earlier. FT and FR are ferroelectric tetragonal and rhombohedral phases, respectively. PC denotes the paraelectric cubic phase. AO and AT stand for anti-ferroelectric orthorhombic and tetragonal phases, respectively. HT stands for high temperature phase, LT stands for low temperature phase. MPB stands for morphotropic phase boundary.

FIG. 3 shows hysteresis measurements of sintered samples based on a $Ca^{2+}$-doped PZT ceramic and further doped with $W^{6+}$—, $Nb^{5+}$—, $Cu^{2+}$— and $Ni^{2+}$-ions. The samples are disk-shaped compacts which were debonded under air atmosphere at 150° C. and sintered at 1150° C. for 4 h. The samples have a diameter of 5.5 mm. The compacts have a diameter of 5 mm and a sample thickness of 180 μm.

In the exemplary hysteresis measurements shown, different values are obtained for the polarization at a defined electric field strength. In particular, the third measured composition Z3 is significantly less polarized than the first two compositions Z1 and Z2 at the same electric field strength.

In general, a high polarizability of the ceramic is desirable when an electric field is applied, as this allows a higher capacitor charge to be achieved. The integral of the polarization over the electric field strength gives the energy stored in the ceramic.

Furthermore, the area enclosed by the hysteresis should be as small as possible, since this is a measure of the energy loss during the charging and discharging process of the capacitor.

The fact that these ceramics are also suitable for sintering at temperatures below the melting point of copper has been demonstrated by multilayer capacitors with copper electrodes. FIG. 4 shows the hysteresis curve of such a multilayer capacitor for one of the materials from FIG. 3.

The low polarization field strength hysteresis indicates only small energetic losses during the charging and discharging process of the capacitor.

Figure 5:
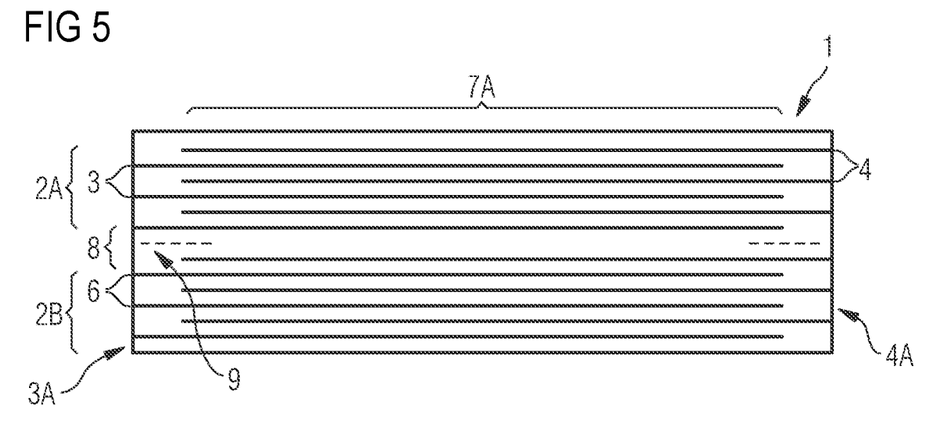
FIG. 5: Cross-sectional side view of a first embodiment of a multilayer capacitor.
Figure 6:
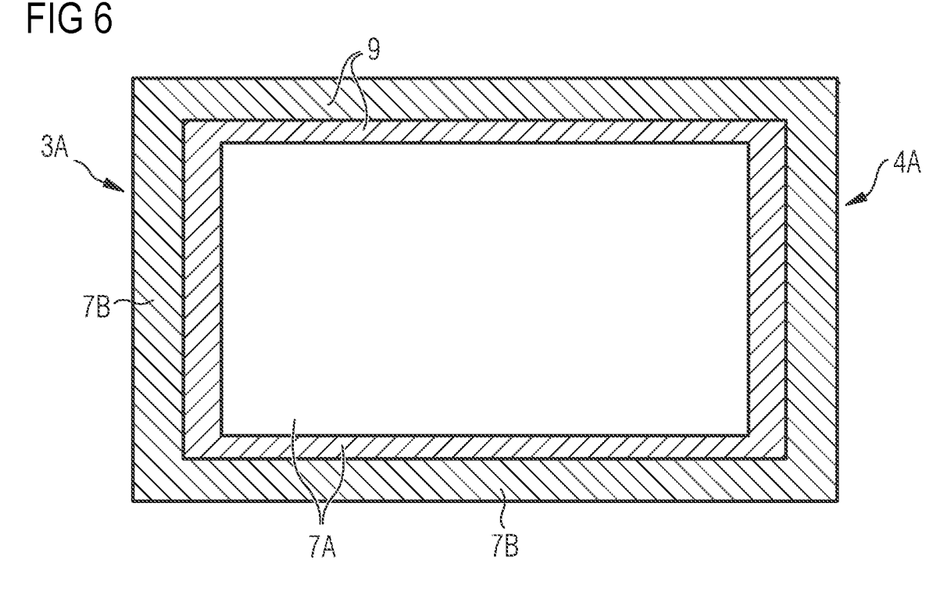
FIG. 6: Cross-section from the top view of the first embodiment of a multilayer capacitor.

FIGS. 5 and 6 show an example of a first embodiment of a multilayer capacitor 1 in two cross-sections from the side view (FIG. 5) and from the top view (FIG. 6), respectively, which comprises the material according to the invention.

The capacitor has two segments 2A and 2B, the segments being arranged one above the other in the stacking direction.

Each segment comprises a stack comprising electrode layers with first electrodes 3, electrode layers with second electrodes 4 and dielectric layers 6 arranged between these electrodes. The said layers are arranged one above the other in a defined stacking direction.

The ends of the first electrodes 3 and second electrodes 4 are exposed at two opposite exit surfaces 3A and 4A of the cuboid multilayer capacitor 1.

Since the electrodes 3/4 do not extend to the opposite exit surface in each case, there are two regions in multilayer capacitor 1 to be distinguished. In the regions in the center of the capacitor, first and second electrodes 3/4 overlap. These regions are called active regions 7A.

Only electrodes of one type, i.e. only first or only second electrodes 3/4, are present at the regions adjacent to the exit surfaces 3A/4A. These regions are called passive regions 7B.

The segments are connected in a connection region 8. Relief regions 9 are present within the connection region 8.

The connection region 8 comprises the same dielectric ceramic material as the dielectric layers in segments 2A and 2B.

The connection region 8 includes the lowermost dielectric layer of a first segment 2A and the uppermost dielectric layer of a second segment 2B, which are arranged one above the other in the stacking direction. There is no electrode inside the connection region 8.

At the edge of the connection region 8, a continuous relief region 9 is located along the entire outer periphery of the capacitor 1. The relief region 9 is located between the lowest dielectric layer of the first segment 2A and the uppermost dielectric layer of the second segment 2B.

The depth of the relief region 9, measured from the outside of the capacitor 1 to the innermost point in the capacitor 1 preferably corresponds to the stack height of a segment.

This ensures that the mechanical stresses due to the deformation of the ceramic in the electric field do not add up across the segments and thus lead to cracks in the material, for example.

The relief region 9 includes all passive regions 7B of the multilayer capacitor 1, i.e., the relief region 9 is arranged within the connection region 8 in parallel with all sections in the segments including only one kind of electrodes or no electrodes. Furthermore, the relief region 9 partially extends into the active region 7A.

Viewed from the stacking direction and as shown in FIG. 6, the active region 7A has the shape of a rectangle. The passive region 7B forms a rectangular frame surrounding the active region 7A. The relief region 9 forms a rectangular frame surrounding the passive region 7B and further partially overlaps with the active region 7A.

The relief region 9 is a region in which the stacked dielectric layers 6 are not firmly or only partially bonded to each other.

Figure 7:
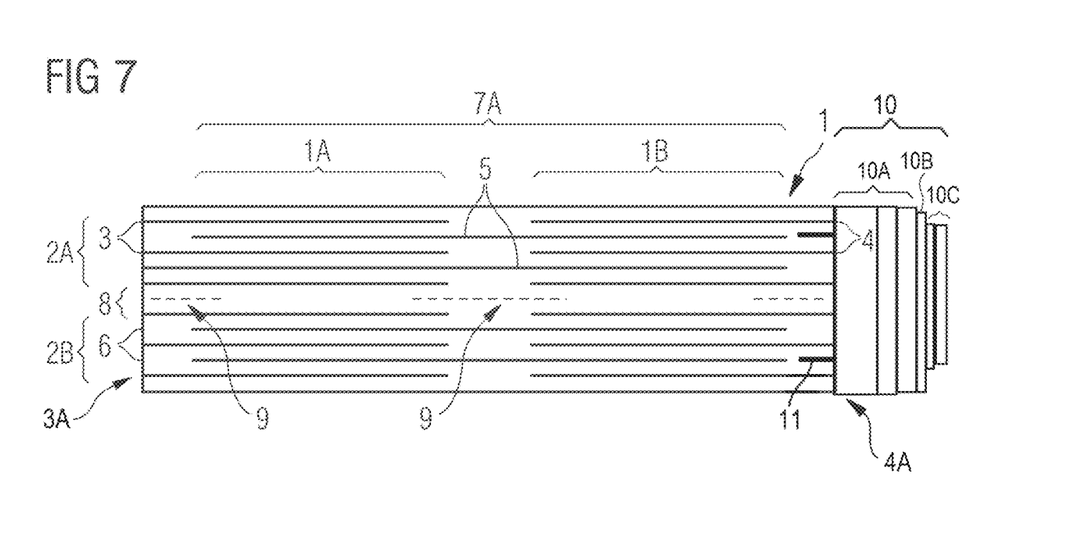
FIG. 7: Cross-sectional side view of a second embodiment of a multilayer capacitor.
Figure 8:
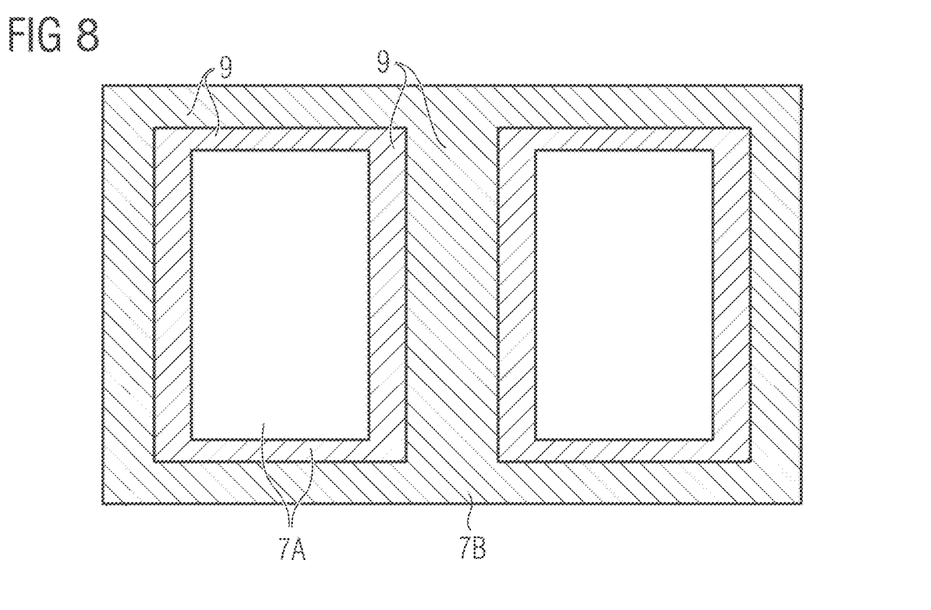
FIG. 8: Cross-section from the top view of the second embodiment of a multilayer capacitor.

The embodiment of the multilayer capacitor 1 shown in FIGS. 7 and 8 is substantially the same as the multilayer capacitor 1 of the first example, which comprises the material according to the invention.

Multilayer capacitor 1 again comprises two segments 2A and 2B, each consisting of layer planes stacked in the same order.

In addition to first and second electrodes 3/4, the segments also comprise third electrodes 5. The third electrodes 5 are internal, so-called floating electrodes, which are not contacted from the outside.

The first and second electrodes 3/4 are each arranged in the same layer plane, but each is separated by a dielectric section.

Layer planes comprising first and second electrodes 3/4 are arranged between the layer planes comprising the third electrodes 5. A dielectric layer 6 is arranged between each of the electrode layers.

Thus, a multilayer capacitor 1 is formed comprising two capacitors connected in series. A first capacitor 1A formed between the first and third electrodes, and a second capacitor 1B formed between the third and second electrodes.

Between the two active regions 7A of capacitors 1A and 1B there is a passive region 7B in which only third electrodes 5 are present, and thus in which no electrodes of different types overlap.

In the connection region 8, two outer dielectric layers of the segments 2A and 2B arranged in the stacking direction of the layers are firmly connected to each other. The connection can be created by sintering, for example.

A relief region 9 is pronounced in the connection region 8. The relief region 9 here is a gap between the first and second segments.

The relief region 9 includes an outer section along the perimeter of the capacitor 1 and an inner section.

The additional inner section is pronounced so that the entire passive region 7B is covered by the relief region 9. Furthermore, the relief region 9 also extends into the outer sections of the two active regions 9A of the capacitors 1A and 1B.

The relief region 9 serves to relieve the capacitor 1 in the event of mechanical deformations due to the applied electric field. The relief region 9 prevents the addition of mechanical stresses over the entire stack height.

The multilayer capacitor 1 includes two separate external contacts for contacting the first and second electrodes 3/4. The external contacts are applied to the exit surfaces 3A/4A on the outside of the capacitor 1 where the first and second electrodes 3/4 (respectively) exit the capacitor.

In FIG. 7, only one of the external contacts is shown for purposes of simplification. The external contact 10 shown in FIG. 7 is applied to the exit surface 4A on the outside of the multilayer capacitor 1 where the second electrodes 4 exit the capacitor 1. The second electrodes 4 are electronically connected to each other via the external contact 10.

The external contact 10 has a multilayer structure comprising a multilayer sputter layer 10A applied to the exit surface 4A, a sintered silver layer 10B covering the sputter layer 10A, and metal sheets 10C attached to the sputter layer 10A via the sintered silver layer 10B.

The capacitor 2 shown in FIG. 7 includes additional electrodes 11 of the same polarity as the electrodes 4. As shown, the additional electrodes 11 do not overlap with any electrodes of a different polarity.

The invention claimed is:

1. A ceramic material for capacitors in multilayer technology of the general formula:

wherein

A is one or more selected from the group consisting of Na, K and Ag;

E is Ni; and $0 < a < 0.14$, $0.05 \leq x \leq 0.3$, $0 \leq b \leq 0.12$, $0.001 < c < 0.12$, $0 \leq d \leq 0.12$, $0 \leq e \leq 0.12$, $0 \leq f \leq 0.12$, and $0.9 \leq y \leq 1.5$ applies.

2. The ceramic material according to claim 1, wherein $0.001 < a < 0.14$.

3. The ceramic material according to claim 1, wherein $0.001 < b < 0.12$.

4. The ceramic according to claim 1, wherein $0.001 < d < 0.12$.

5. The ceramic according to claim 1, wherein $0.001 < e < 0.12$.

6. The ceramic according to claim 1, wherein $0.001 < f < 0.12$.

7. The ceramic according to claim 1, wherein $0.005 < b+c+d+e+f$.

8. The ceramic according to claim 1, wherein the ceramic material is an anti-ferroelectric dielectric.

9. The ceramic according to claim 1, wherein the sintering temperature of the ceramic material is between 900° C. and 1200° C.

10. The ceramic material according to claim 9, wherein the sintering temperature of the ceramic material is between 980° C. and 1080° C.

11. The ceramic material according to claim 9, wherein the sintering temperature of the ceramic material is below the melting point of copper.

12. The ceramic material according to claim 11, wherein the sintering temperature of the ceramic material is below the melting point of silver.

13. A capacitor comprising dielectric layers made of a ceramic material, and electrode layers disposed therebetween and stacked in a layer order, wherein the electrode layers comprise at least first and/or second electrodes, and wherein the ceramic material has the following general formula:

$$Pb_{(y-1.5a-0.5b+c+0.5d-0.5e-f)}Ca_aA_b(Zr_{1-x}Ti_x)_{(1-c-d-e-d)}E_cFe_dNb_eW_fO_3,$$

wherein

A is one or more selected from the group consisting of Na, K and Ag;

E is Ni; and $0<a<0.14$,
$0.05 \le x \le 0.3$,
$0 \le b \le 0.12$,
$0.001 < c < 0.12$,
$0 \le d \le 0.12$,
$0 \le e \le 0.12$,
$0 \le f \le 0.12$, and
$0.9 \le y \le 1.5$ applies.

14. The capacitor according to claim 13, the capacitor comprising two segments,
   wherein each segment comprises dielectric layers of the ceramic material and electrode layers arranged in between,
   wherein outermost dielectric layers of the two segments form a connection region in which the segments are firmly connected to one another parallel to the layer planes,
   wherein the connection region includes a relief region in which the segments are not firmly connected to each other.

15. The capacitor according to claim 13, wherein two separate external contacts for contacting the first and second electrodes are applied to exit surfaces on the outside of the capacitor, on which electrodes exit from the capacitor.

16. The capacitor according to claim 15 comprising at least one third electrode not contacted by any of the external contacts, said third electrode overlapping with said first and second electrodes.

17. The capacitor according to claim 15, wherein the external contacts comprise a multilayer sputter layer comprising layers of chromium, nickel and at least one of silver or gold, the layers being deposited on the exit surfaces in that order.

18. The capacitor according to claim 17, wherein the external contacts comprise metal sheets deposited on the sputter layer by means of a sintered silver layer.

19. The capacitor according to claim 18, wherein the metal sheets comprise two copper layers and an invar layer disposed therebetween.

20. The capacitor according to claim 15, wherein the capacitor comprises separable capacitor units, which can be assembled and disassembled as desired at a contact surface, the contact surface being arranged perpendicular to layer planes and the external contacts.

21. The capacitor according to claim 13, comprising further electrodes which do not overlap with any electrodes of a different polarity.

22. The capacitor according to claim 13, wherein the ceramic material fulfills $0.001<a<0.14$.

23. The capacitor according to claim 13, wherein the ceramic material fulfills $0.001<b<0.12$.

24. The capacitor according to claim 13, wherein the ceramic material fulfills $0.001<d<0.12$.

25. The capacitor according to claim 13, wherein the ceramic material fulfills $0.001<e<0.12$.

26. The capacitor according to claim 13, wherein the ceramic material fulfills $0.001<f<0.12$.

27. The capacitor of claim 13, wherein the ceramic material fulfills $0.005<b+c+d+e+f$.

28. The capacitor according to claim 13, wherein the ceramic material is an anti-ferroelectric dielectric.

29. A ceramic material for capacitors in multilayer technology of the general formula:

$$Pb_{(y-1.5a-0.5b+c+0.5d-0.5e-f)}Ca_aA_b(Zr_{1-x}Ti_x)_{(1-c-d-e-d)}E_cFe_dNb_eW_fO_3,$$

wherein

A is one or more selected from the group consisting of Na, K and Ag;

E is Hf; and $0<a<0.14$,
$0.05 \le x \le 0.3$,
$0 \le b \le 0.12$,
$0.001 < c < 0.12$,
$0 \le d \le 0.12$,
$0 \le e \le 0.12$,
$0 \le f \le 0.12$, and
$0.9 \le y \le 1.5$ applies.

30. A capacitor comprising
   dielectric layers made of a ceramic material, and electrode layers disposed therebetween and stacked in a layer order,
   wherein the electrode layers comprise at least first and/or second electrodes, and wherein the ceramic material has the following general formula:

$$Pb_{(y-1.5a-0.5b+c+0.5d-0.5e-f)}Ca_aA_b(Zr_{1-x}Ti_x)_{(1-c-d-e-d)}E_cFe_dNb_eW_fO_3,$$

wherein

A is one or more selected from the group consisting of Na, K and Ag;

E is Hf; and $0<a<0.14$,
$0.05 \le x \le 0.3$,
$0 \le b \le 0.12$,
$0.001 < c < 0.12$,
$0 \le d \le 0.12$,
$0 \le e \le 0.12$,
$0 \le f \le 0.12$, and
$0.9 \le y \le 1.5$ applies.

31. A ceramic material for capacitors in multilayer technology of the general formula:

$$Pb_{(y-1.5a-0.5b+c+0.5d-0.5e-f)}Ca_aA_b(Zr_{1-x}Ti_x)_{(1-c-d-e-d)}E_cFe_dNb_eW_fO_3,$$

wherein

A is one or more selected from the group consisting of Na, K and Ag;

E is one or more selected from the group consisting of Ni, Hf and Si; and $0<a<0.14$,
$0.05 \le x \le 0.3$,
$0 \le b \le 0.12$,
$0.001 < c < 0.12$,
$0 \le d \le 0.12$,
$0 \le e \le 0.12$,
$0 \le f \le 0.12$, and
$0.9 \le y \le 1.5$ applies, and
   wherein the ceramic material has an anti-ferroelectric orthorhombic crystalline structure.

32. A capacitor comprising
dielectric layers made of a ceramic material, and electrode layers disposed therebetween and stacked in a layer order,
wherein the electrode layers comprise at least first and/or second electrodes, and wherein the ceramic material has the following general formula:

$$Pb_{(y-1.5a-0.5b+c+0.5d-0.5e-f)}Ca_a A_b (Zr_{1-x}Ti_x)_{(1-c-d-e-d)} E_c Fe_d Nb_e W_f O_3,$$

wherein
A is one or more selected from the group consisting of Na, K and Ag;
E is one or more selected from the group consisting of Ni, Hf and Si; and
$0 < a < 0.14$,
$0.05 \leq x \leq 0.3$,
$0 \leq b \leq 0.12$,
$0.001 < c < 0.12$,
$0 \leq d \leq 0.12$,
$0 \leq e \leq 0.12$,
$0 \leq f \leq 0.12$, and
$0.9 \leq y \leq 1.5$
applies, and
wherein the ceramic material has an anti-ferroelectric orthorhombic crystalline structure.

* * * * *